Sept. 19, 1967  L. O. MESENHIMER  3,343,062
REGULATED PHASE CONTROLLED POWER SUPPLY
Filed Nov. 27, 1964  2 Sheets-Sheet 1

FIG. I

INVENTOR.
LEE O. MESENHIMER
BY John Howard Smith
ATTY.

Sept. 19, 1967  L. O. MESENHIMER  3,343,062
REGULATED PHASE CONTROLLED POWER SUPPLY
Filed Nov. 27, 1964  2 Sheets-Sheet 2

*INVENTOR.*
LEE O. MESENHIMER
BY
ATTY.

United States Patent Office 3,343,062
Patented Sept. 19, 1967

3,343,062
REGULATED PHASE CONTROLLED POWER SUPPLY
Lee O. Mesenhimer, Lakewood, Ohio, assignor to Lorain Products Corporation, a corporation of Ohio
Filed Nov. 27, 1964, Ser. No. 414,210
15 Claims. (Cl. 321—2)

ABSTRACT OF THE DISCLOSURE

A power supply having a DC source and providing a regulated output voltage. The unit comprises a transistor bridge converter including master and slave oscillators, a phase detector for detecting the relative phase between master and slave oscillators, a timing circuit responsive to the detector and having an output connected to the slave oscillator through switching control means, the detector initiating the timing interval of the timing circuit and the timing circuit terminating the timing interval by initiating switching activity in the slave oscillator, the timing circuit including a unijunction transistor, the pulse interval of which is varied by sensing or control means responsive to a signal such as the voltage across the load which is being supplied by the unit.

---

This invention relates to D-C to D-C converters and is directed more particularly to a D-C to D-C converter of the type in which the output voltage is controlled by varying the phase relationship between a master oscillator and a slave oscillator to control the pulse width of voltage produced by a quasi square wave generator included in the converter.

It is an object of the invention to provide means for energizing the timing circuit of a D-C to D-C converter independently of the quasi square wave generator utilized therein.

It is another object of the invention to provide circuitry for detecting the phase relationship between the master and slave oscillators of a D-C to D-C converter and to appropriately energize a timing circuit which controls the switching of the slave oscillator.

It is a further object of the invention to provide circuitry which applies voltage to a unijunction transistor oscillator to begin a timing period each time the master oscillator and the slave oscillator achieve a predetermined phase relationship.

An additional object of the invention is to provide circuitry of the above character in which a portion of the square wave output voltage of a master oscillator is compared to a portion of the square wave output voltage of a slave oscillator, the resultant quasi square wave voltage being supplied to the timing circuit of the converter.

Yet another object of the invention is to provide, for a D-C to D-C converter of the type described above, a phase detecting circuit which in one embodiment has the primary winding of a transformer connected between the master oscillator and the slave oscillator, the secondary winding of the transformer being connected through rectifying means to the timing circuit.

It is still another object of the invention to provide a first detecting winding on the master oscillator connected with a second detecting winding on the slave oscillator and with rectifying means to supply voltage to a unijunction oscillator circuit each time the master and the slave oscillator are of a predetermined phase relationship.

Other objects and advantages of the invention will become apparent from the following description and accompanying drawings in which.

Figure 1:
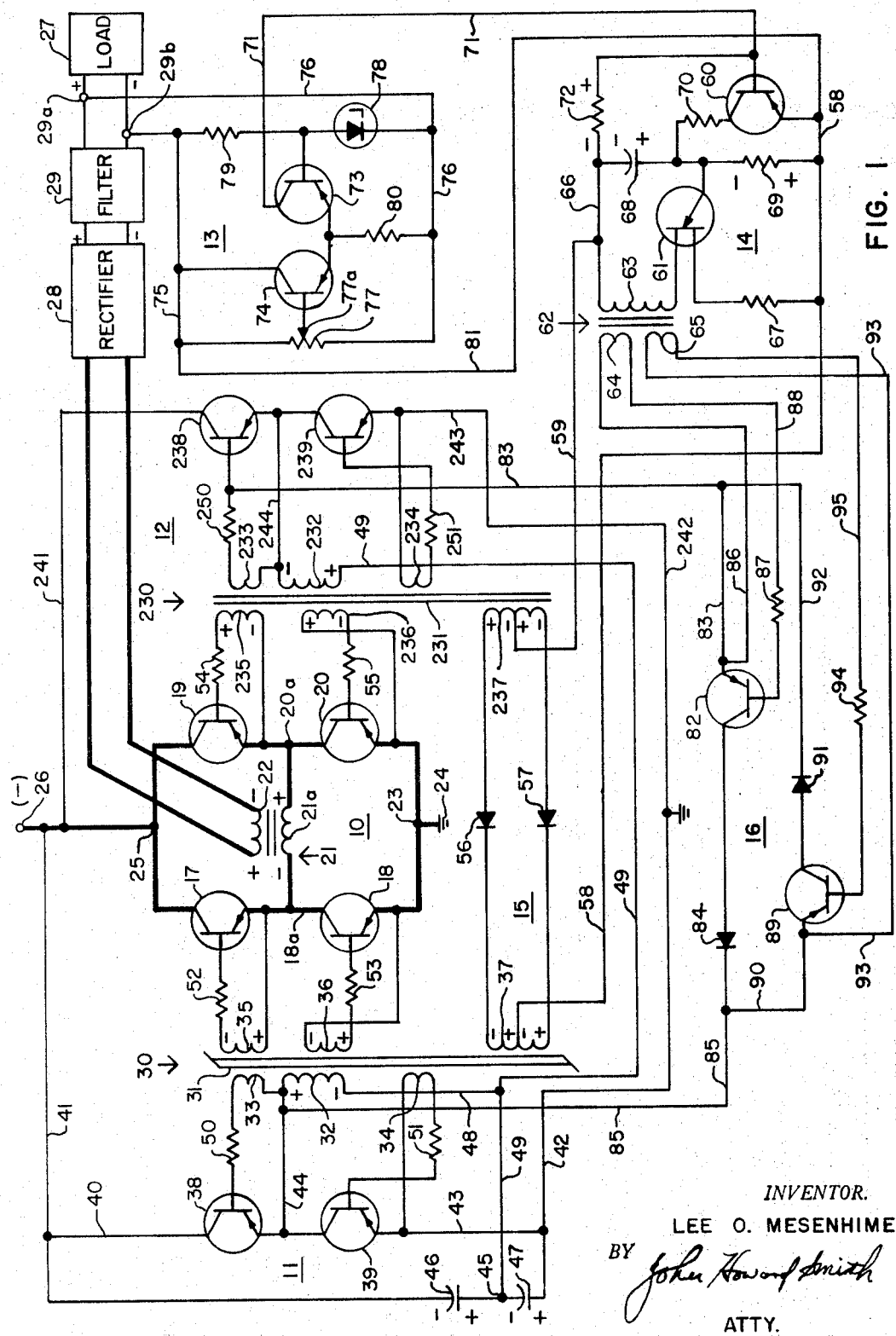
FIGURE 1 is a schematic diagram of circuitry embodying the invention.

Referring to FIGURE 1, it will be seen that circuitry embodying the invention may include a power bridge circuit 10, a master oscillator circuit 11, a slave oscillator circuit 12, an output voltage sensing circuit 13, a timing circuit 14, a phase detecting circuit 15 and a switching control circuit 16. As will be seen presently, the phase detecting circuit 15 supplies voltage and current to the timing circuit 14 when the master oscillator 11 is out of phase with the slave oscillator 12. As soon as the timing circuit 14 is energized, a timing period begins at the end of which a voltage pulse will be delivered to the switching control circuit 16 thereby causing the slave oscillator 12 to switch. The timing period is appropriately lengthened or shortened by the output voltage sensing circuit 13 to prevent variation of the output voltage of the converter due to changes in either the input voltage or the current drawn by the load.

Figure 3:
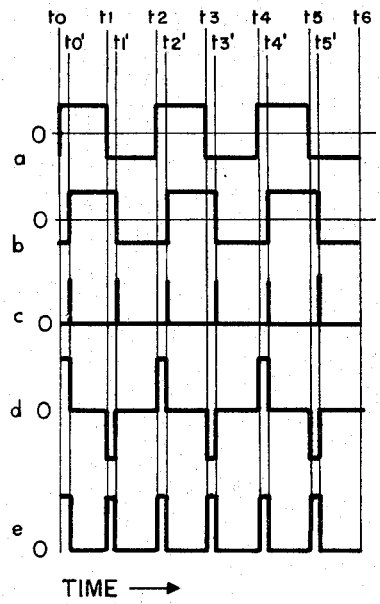

The waveshapes identified by the letters $a$, $b$, $c$, $d$ and $e$ in FIGURE 3 illustrate the output voltages of the master oscillator 11, the slave oscillator 12, the timing circuit 14, the power bridge 10 and the phase detecting circuit 15, respectively. It will be seen that the lead edges of the quasi square wave pulses shown in 3$d$ coincide with the verticals $t_1$ through $t_6$ which define the switching activity of the master oscillator 11. The trailing edges of the quasi square wave pulses coincide with the timing circuit pulses of 3$c$ and the switching of the slave oscillator 12 as shown by the verticals $t_1'$ through $t_6'$. The positioning of the verticals identified by $t_1'$ through $t_6'$ is variable with respect to time end is controlled by the timing circuit pulses of 3$c$.

If the timing period, as determined by the output voltage sensing circuit 13, is short, the timing pulses as shown in 3$c$ will be positioned near and to the right of the verticals $t_1$ through $t_6$. Accordingly, since the trailing edges of the pulses of 3$d$ coincide with the timing pulses, the pulse width of the quasi square wave will be relatively small.

Figure 4:
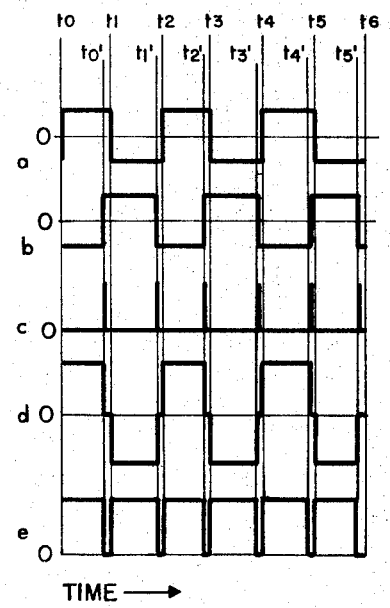

A long timing period, on the other hand, will cause the timing pulses to be positioned farther to the right as shown in FIGURE 4$c$. The waveshapes at various points in the circuit for such a condition are shown in FIGURE 4. It will be seen from FIGURE 4$d$ that the pulse width of the quasi square wave output voltage of the power bridge is relatively great when the timing period is long.

The voltage supplied to the timing circuit 14 by the detecting circuit 15 is illustrated in FIGURES 3 and 4 by the waveshapes identified by the letter $e$. This voltage comprises a series of pulses all of the same polarity, the width of each pulse corresponding to the length of the timing period.

The power bridge circuit 10 may include P-N-P type transistors 17, 18, 19 and 20 and a transformer 21 having a primary winding 21$a$ and a secondary winding 22. To form the power bridge 10, the collector electrode of the transistors 18 and 20 are connected to the emitter electrodes of the transistors 17 and 19, respectively, the emitter electrodes of the transistors 18 and 20 are connected to a junction point 23 which is grounded, as at 24, and the collector electrodes of the transistors 17 and 19 are connected to a junction point 25 which is connected to a negative potential as at 26. The power bridge 10 is completed by connecting the primary winding 21$a$ of the transformer 21 between the lead 18$a$ and the lead 20$a$.

The voltage developed across the secondary winding 22 is supplied through a suitable rectifier 28 and a filter 29 to a load 27 connected across output terminals 29a and 29b.

It will be seen that when the transistors 17 and 20 conduct simultaneously, current will flow through the primary winding 21a from right to left as viewed in the drawing. In a like manner, when transistors 18 and 19 are simultaneously conducting and the transistors 17 and 20 are turned off, current will flow through the primary winding 21a from left to right. This simultaneous conduction of the transistors 17 and 20 or alternately of transistors 18 and 19 will produce a square wave voltage on the secondary winding 22.

However, in the circuitry embodying the instant invention, it is desirable to develop a quasi square wave voltage of variable pulse width across the secondary winding 22. By decreasing the pulse width of the quasi square wave voltage as load current decreases, the output voltage delivered to load 27 will be maintained constant by the compensating action of the varying width of the quasi square wave signals. The load voltage will likewise be maintained constant if the pulse width is increased correspondingly as load current increases. Such a quasi square wave voltage may be produced on the secondary winding 22 by controlling the conduction of the transistors 17 and 18 from the master oscillator 11 and by controlling the conduction of transistors 19 and 20 from a slave oscillator 12.

When the switching of the slave oscillator 12 is lagging the switching of the master oscillator 11 by a short length of time, the pulse width of the quasi square wave voltage will be narrow as shown at d in FIGURE 3. When this operational lag is relatively long, the pulse width of the quasi square wave will be correspondingly great as shown at d in FIGURE 4. Thus it will be seen that by varying the operational lag of the slave oscillator 12 the pulse width of the quasi square wave voltage developed across the secondary winding 22 will be increased or decreased appropriately to prevent changes in the voltage applied to the load 27 as the current requirements of the load vary.

The master oscillator 11 which controls the transistors 17 and 18 may include a transformer 30 having a saturable core 31 with a primary winding 32, feedback windings 33 and 34, drive windings 35 and 36 and a center tapped detecting winding 37 carried thereon. In order to develop an A-C current flow in the primary winding 32, a pair of switching transistors 38 and 39 are provided. These transistors are energized by connecting the collector electrode of the transistor 38 to the negative potential at 26 through leads 40 and 41, by connecting the emitter electrode of the transistor 39 to a grounded lead 42 by means of a lead 43 and by connecting the emitter electrode of the transistor 38 and the collector electrode of the transistor 39 to the upper end of the primary winding 32 through a lead 44.

The current path for the primary winding current is completed by connecting the lower end of the primary winding 32 to a junction point 45 between the capacitors 46 and 47. These capacitors are serially connected between the lead 41 and the lead 42 and are thus across the D-C source connected between the terminal 26 and ground 24. The switching or alternate conduction of the transistors 38 and 39 is established by connecting the feedback winding 33 and the resistor 50 between the base and the emitter electrode of the transistor 38 and by connecting the feedback winding 34 and a resistor 51 between the emitter electrode and the base electrode of the transistor 39.

From the foregoing it will be seen that the master oscillator 11 is of the saturable core type in which the non-conducting transistor turns on and the conducting transistor turns off to reverse current flow through the primary winding 32 each time the core 31 saturates. When the transistor 39 is conducting, current flows from the lower side of the capacitor 47 through lead 43, the emitter-collector path of transistor 39 to a lead 44, primary winding 32, the lead 48 and the lead 49 to the junction point 45 which is common to the upper side of the capacitor 47. On the alternate half cycle when the transistor 38 conducts, current flows from the lower side of the capacitor 46 to the lead 49, the lead 48, the primary winding 32, the lead 44, the emitter-collector path of the transistor 38, the lead 40 to the upper side of the capacitor 46. Thus, by the switching action of the transistors 38 and 39, a square wave voltage is induced on the drive windings 35 and 36 and the center-tapped detecting winding 37 from the primary winding 32.

In order to render the power bridge transistors 17 and 18 alternately conducting, the drive winding 35 is connected with a bias resistor 52 between the base electrode and the emitter electrode of the transistor 17 and the drive winding 36 is connected with a bias resistor 53 between the base electrode and the emitter electrode of the transistor 18. With this arrangement, each time the current flow through the primary winding 32 of transformer 30 reverses, the bias voltage applied to the transistors 17 and 18 from the drive windings 35 and 36, respectively, will reverse thereby causing the transistors 17 and 18 to interchange conducting conditions.

The slave oscillator 12 is similar to the master oscillator 11 and components of the slave oscillator 12 are identified by the same two numerals as their counterparts in the master oscillator 11 but prefixed by the numeral 2. The core 231 of the transformer 230 of the slave oscillator 12, unlike the core 31 of the transformer 30, does not saturate. Accordingly, another means is provided to cause switching of the transistors 19 and 20, as will be described presently.

The alternate conduction of the power bridge transistors 19 and 20 is effected by connecting the drive winding 235 with a bias resistor 250 between the base electrode and an emitter electrode of the transistor 19 and by connecting the drive winding 236 and a bias resistor 251 between the base electrode and emitter electrode of the transistor 20. Thus, the transistors 19 and 20 are rendered alternately conducting whereby with the alternately conducting activity of transistors 17 and 18, a quasi square wave voltage will be developed across the secondary winding 22 when the switching action of the transistors 238 and 239 lag the switching activity of transistors 38 and 39 of the master oscillator 11 time-wise by the duration of a variable timing period to be described presently.

Observing the polarities indicated on the drive windings 35 and 236 of the transformers 30 and 230, respectively, it will be seen that the transistors 17 and 20 of the power bridge 10 are conducting. Consequently, current will flow from right to left through the primary winding 21a producing a voltage of the polarity indicated. This condition will prevail until the slave oscillator 12 is caused to switch by the switching control circuit 16, which will be described presently. The switching action of the slave oscillator 12 will render the transistor 19 conducting and turn the transistor 20 off and current flow through the primary winding 21 will cease.

When the transistors 38 and 39 of the master oscillator 11 switch, the transistor 17 will turn off and the transistor 18 will conduct. With transistors 18 and 19 both conducting, current will now flow from left to right through primary winding 21 and the voltage polarity on the windings of the transformers 32 and 232 will be opposite to that indicated in FIGURE 1.

The phase relationship between the master oscillator 11 and the slave oscillator 12 will be understood by comparing the polarity at the upper end of the primary winding 32 of the transformer 30 to the polarity at the upper end of the primary winding 232 of the transformer 230. The polarity of the upper end of each of the windings 32 and 232 with respect to time and using the lead 49 as zero reference is illustrated by waveshapes a and b, respectively, of FIGURES 3 and 4. When the upper ends of the primary windings 32 and 232 are of like polarity, that is, both are positive or negative with respect to lead 49, the master oscillator 11 and the slave oscillator 12 may be considered to be in phase and no current flows in the primary winding 21a of transformer 21. However, when the polarity of the upper end of the primary winding 32 differs from the polarity of the upper end of the primary winding 232, the master oscillator 11 is considered to be out of phase with the slave oscillator 12 and there will be current flow through the primary winding 21a. Consequently, voltage will be present across the secondary winding 22, as shown by waveshape d of FIGURES 3 and 4, when the master oscillator 11 and the slave oscillator 12 are out of phase.

To the end that the timing circuit 14 will begin a timing period each time the transitsors 38 and 39 of the master oscillator 11 switch as defined by the verticals $t_1$ through $t_6$ in FIGURES 3 and 4, the phase detecting circuit 15 is provided. This circuit is formed by connecting a diode 56 between the upper end of the detecting winding 37 and the upper end of the detecting winding 237 and by connecting a diode 57 between the lower end of these detecting windings. The phase detecting circuit 15 is completed by connecting the center-tap of the winding 37 to the timing circuit 14 by means of a lead 58 and by also connecting the center tap of the detecting winding 237 to the timing circuit by means of a lead 59. The windings 37 and 237 serve as means for comparing an instantaneous output voltage of the master oscillator to an instantaneous voltage of the slave oscillator.

It will be understood that rectifying arrangements other than that just described may be employed in the phase detecting circuit 15. For example, windings 37 and 237 may be serially connected between the input terminals of a full wave bridge rectifier, having a positive output terminal connected to lead 58 and a negtaive output terminal connected to lead 59.

The output voltage of the phase detecting circuit 15 is illustrated by the waveshape e in FIGURE 3 and 4. Using lead 59 as zero reference, this voltage appears in the form of positive pulses on the lead 58. From FIGURES 3 and 4 it will be seen that the leading edges of these pulses coincide with the switching of the master oscillator 11 and the verticals $t_1$ through $t_6$. The trailing edge of these pulses occur when the slave oscillator 12 switches in response to a signal from the timing circuit at the end of the timing period as defined by the verticals $t_1'$ through $t_6'$.

The timing circuit 14 may include a P-N-P type transistor 60, a unijunction transistor 61 and a pulse transformer 62 having a primary winding 63 and a pair of secondary windings 64 and 65. A first base electrode of the unijunction transistor 61 is connected to a lead 66 through the primary winding 63 of the pulse transformer 62 while a second base electrode is connected to the lead 58 through a resistor 67. In order to generate a pulse of current in the primary winding 63 of the pulse transformer 62 at the end of each timing period, the emitter electrode of the unijunction transistor 61 is connected to a point between a capacitor 68 and a resistor 69 which are serially connected between the leads 58 and 66.

For the purpose of controlling the duration of the timing period, the emitter electrode of the transistor 60 is connected to the lead 58, the collector electrode is connected to the lower end of the capacitor 68 through a resistor 70 and the base electrode is connected to the output voltage sensing circuit 13 through a lead 71. Bias for the transistor 60 is provided by a resistor 72 which is connected between the base electrode of the transistor 60 and the upper side of the capacitor 68. The output voltage sensing circuit 13 serves to control the conduction of the transistor 60 and, therefore, determines the timing period and the pulse width of the quasi square wave voltage appearing on the secondary winding 22.

The output voltage sensing circuit 13 may include, by way of example, P-N-P type transistors 73 and 74. Power to energize the sensing circuit 13 is supplied from the output terminals 29a and 29b through leads 75 and 76. A comparison of the output voltage appearing between the output terminals 29a and 29b to a reference voltage is effected by connecting the base electrode of the transistor 74 to a wiper arm 77a of a potentiometer connected between the leads 75 and 76 and by connecting the base electrode of the transistor 73 to a point between a zener diode 78 and a resistor 79 which are serially connected between leads 75 and 76. Transistors 73 and 74 are arranged to form a differential amplifier by connecting the collector electrode of transistor 74 to the lead 75 and by connecting the emitter electrodes of the transistors 73 and 74 to the lead 76 through a resistor 80. The collector electrode of the transistor 73 is connected to the base electrode of transistor 60 by means of the lead 71 while lead 75 is connected to the lead 58 through a lead 81 to complete the voltage sensing circuit 13. The leads 71 and 81 interconnect the output voltage sensing circuit 13 and the timing circuit 14.

As explained previously, the pulse generated by the timing circuit 14 at the end of each timing period, as depicted by the waveshape 3c of FIGURES 3 and 4, is to be utilized to cause switching of the transistors 238 and 239 of the slave oscillator 12. To this end, the switching control circuit 16 is provided. This circuit may include a P-N-P type transistor 82 having an emitter electrode connected to the base electrode of transistor 238 through a lead 83 and a collector electrode connected to the upper end of the primary winding 32 of transformer 30 through a diode 84 and a lead 85. The conduction of transistor 82 is controlled by connecting the emitter electrode thereof to the upper end of the secondary winding 64 of the pulse transformer 62 through a lead 86 and by connecting the base electrode of that transistor to the lower end of the secondary winding 64 through a bias resistor 87 and a lead 88. Because the diode 84 is a unidirectional conducting device, conduction of the transistor 82 permits current to flow from the base electrode of the transistor 238 to the upper end of the primary winding 32 of transformer 30 when the polarities of the winding 32 and 232 are opposite to those shown in FIGURE 1. This current flow causes the transistor 238 to turn on and the transistor 239 to turn off thereby producing switching activity in the slave oscillator 12.

To the end that the transistor 238 may be made to turn off to continue the switching activity of the slave oscillator 12 when the windings 32 and 232 have polarities, as indicated in FIGURE 1, there is provided a P-N-P type transistor 89 having an emitter electrode connected to the lead 85 through a lead 90 and having a collector electrode connected to the lead 83 by means of a diode 91 and a lead 92. The conduction of the transistor 89 is controlled by connecting the emitter electrode thereof to the upper end of the secondary winding 65 of the pulse transformer 62 through a lead 93 and by connecting the base electrode of that transistor to the lower end of the winding 65 through a bias resistor 94 and a lead 95.

The operation of the circuit shown in FIGURE 1 will now be described. Assuming that the transistors 38 and 39 of the master oscillator 11 have just switched and the polarities across the various components of the circuit are as indicated in FIGURE 1, transistors 20 and 17 will be conducting and current will flow from right to left to the primary winding 21a. Immediately upon the switching of the transistors 38 and 39, current flows from the upper side of the detecting winding 237 on the transformer 230 through the diode 56, the upper half of the detecting winding 37 of the transformer 30, the lead 58, the emitter-collector path of the transistor 60, and the resistor 70 to the lower side of the capacitor 68. The current is returned to the center tap of the detecting winding 237 from the upper side of the capacitor 68 through the leads 66 and 59. The conduction of the transistor 60, as will be explained presently, controls the charging rate of the capacitor 68.

After a time, the voltage across the capacitor 68 will be greot enough to cause the unijunction transistor 61 to fire. When this occurs, current will flow from the lower side of capacitor 68 through the emitter and first base of the unijunction transistor 61 and the primary winding of the pulse transformer 62 to the upper side of the capacitor 68. This discharge of the capacitor 68 terminates the timing period.

The pulse of current which flows through the primary winding 63 of the pulse transformer, when the capacitor 68 discharges, induces voltage on each of the secondary windings 64 and 65 such that the upper end of each of these windings becomes positive with respect to the lower end. Since the secondary windings 64 and 65 are connected between the emitter electrode and the base electrode of the transistors 82 and 89, respectively, these transistors will be forward biased due to the voltages induced on the secondary windings 64 and 65.

Despite the fact that the transistors 82 and 89 are both forward biased by the pulse of voltage from the timing circuit, only one of them will conduct due to the presence of the diodes 84 and 91 and depending on the polarity relationship between the upper end of the primary winding 32 of the transformer 30 and the upper end of the primary winding 232 of the transformer 230. In this instance, due to the polarities indicated, the transistor 89 will conduct and current will flow from the upper end of the primary winding 32 through the lead 85, the lead 90, the emitter-collector path of the transistor 89, the diode 91, lead 92, lead 83, the resistor 250, and the feedback winding 233 to the upper end of the primary winding 232. Thus, the positive potential at the upper end of the primary winding 32 is applied to the base electrode of the transistor 238 causing it to turn off with result that the transistor 239 will switch on.

When the transistors 238 and 239 switch, due to the conduction of the transistor 89, the polarity of the primary winding 232 will reverse and, consequently, forward bias will be applied to the transistor 19 while the transistor 20 will be turned off. With the transistors 17 and 19 both forward biased and the transistors 18 and 20 both reverse biased after the switching of the transistors 238 and 239 at the end of the timing period, no current will flow through the primary winding 21a of the transformer 21 and, consequently, no voltage will be present on the secondary winding 22 and no voltage will be applied to the timing circuit 14 from the phase detecting circuit 15.

After a time, the core 31 of the transformer 30 will saturate causing the transistor 39 to switch off and the transistor 38 to turn on. When this happens, the polarity of the primary winding 32 will reverse and, therefore, all the polarities of the windings of transformers 32 and 232 are now opposite to those indicated in FIGURE 1. Transistors 18 and 19 will now be conducting and current will flow from left to right through the primary winding of 21a and the voltage appearing on the secondary winding 22 will be of opposite polarity to that which was present when transistors 17 and 20 were conducting.

Because the winding polarities have now reversed, current will flow from the lower end of the detecting winding 237 of the phase detecting circuit through the diode 57 of the lower half of the detecting winding 37, the lead 58, the emitter-collector path of the transistor 60 and the resistor 70 to the lower side of capacitor 68. The current then returns to the center tap of the detecting winding 237 from the upper side of the capacitor 68 through the leads 66 and 59. This current will continue to charge capacitor 68 until the unijunction transistor 61 fires and allows the capacitor 68 to discharge through the primary winding 63 to end the timing period as described previously.

The pulse of current through the primary winding 63 of the pulse transformer at the end of the timing period forward biases the transistors 82 and 89. In this instance, since the upper end of the primary winding 232 of the transformer 230 is positive with respect to the lower end thereof and the upper end of the primary winding 32 of the transformer 30 is more negative than its lower end, transistor 82 will conduct. The current will flow from the upper end of the primary winding 232 to the emitter-base path of the transistor 238, the lead 83, the emitter-collector path of the transistor 82, the diode 84, and the lead 85 to the upper end of the primary winding 32. This current flow forward biases the transistor 238 causing it to turn on and, consequently, transistor 239 will turn off.

The foregoing switching of the transistors 238 and 239 causes a potential of the polarity indicated in FIGURE 1 to appear on the primary winding 232 of the transformer 230. As a result, the transistor 20 will be forward biased and transistor 19 will be turned off. Since the transistors 17 and 19 now are both nonconducting, there will be no current flow in the primary winding 21a of the transformer 21 and the voltage across the secondary winding 22 will be zero. This condition will persist until the transistors 38 and 39 of the master oscillator 11 again switch.

The span of time during which current flows through the primary winding 21a and, consequently, the pulse width of the quasi square wave voltage appearing on the secondary winding 22 corresponds to the timing period during which the capacitor 68 charges. This timing period begins each time the transistors 38 and 39 switch and ends when the unijunction transistor 61 fires causing the transistors 238 and 239 to switch by the operation of the transistors 82 or 89 of the switching control section 16. The pulse width of the quasi square wave voltage increases or decreases in a corresponding manner to the increase or decrease of the timing period.

It will be seen that if the transistor 60 is highly conducting when current is being supplied from the phase detecting circuit 15 to the capacitor 68, the capacitor 68 will charge rapidly and the unijunction 61 will fire relatively soon after the capacitor 68 begins to charge. However, if the conduction of the transistor 60 is low, the capacitor 68 will charge relatively slowly and the timing period will be substantially longer than was the case when the transistor 60 was highly conducting. The conduction of the transistor 60 is controlled by the output voltage sensing circuit to lengthen or shorten the timing period appropriately so that the voltage appearing between the terminals 29a and 29b remains constant despite a wide variation in the magnitude of current drawn by the load 27.

The operation of the output voltage sensing circuit will now be described. Assuming that the load 27 begins to draw more current, the voltage between the output terminals 29a and 29b and the voltage across the potentiometer 77 will decrease slightly. Because of the decreased voltage across the potentiometer 77, the conduction of the resistor 74 will decrease thereby causing an increase in the conduction of transistor 73 and, therefore, more current flows from the collector of the transistor 73 to the lead 71 and through the resistor 72 of the timing circuit. The increased current through the resistor 72 causes the base electrode of the transistor 60 which is connected to the right end of the resistor 72, as shown, to become more positive with respect to the emitter electrode of that transistor. This reduces the conduction of transistor 60 so that the timing period is lengthened, thereby increasing the pulse width of the quasi square wave voltage appearing on the secondary winding 22 by an amount appropriate to nullify the decrease in voltage which would otherwise occur between the output terminals 29a and 29b due to the increased current requirements of the load 27.

If the voltage between the output terminals 29a and 29b tends to increase, the conduction of transistor 74 will increase thereby reducing the conduction of the transistor 73. This, in turn, reduces the current flow through the resistor 72 allowing the conduction of the transistor 60 to increase whereby the capacitor 68 charges rapidly and the timing period is shortened. This reduced timing period decreases the pulse width of the quasi square wave appearing on the secondary winding 22 so that the voltage between the output terminals 29a and 29b is prevented from increasing.

Figure 2:
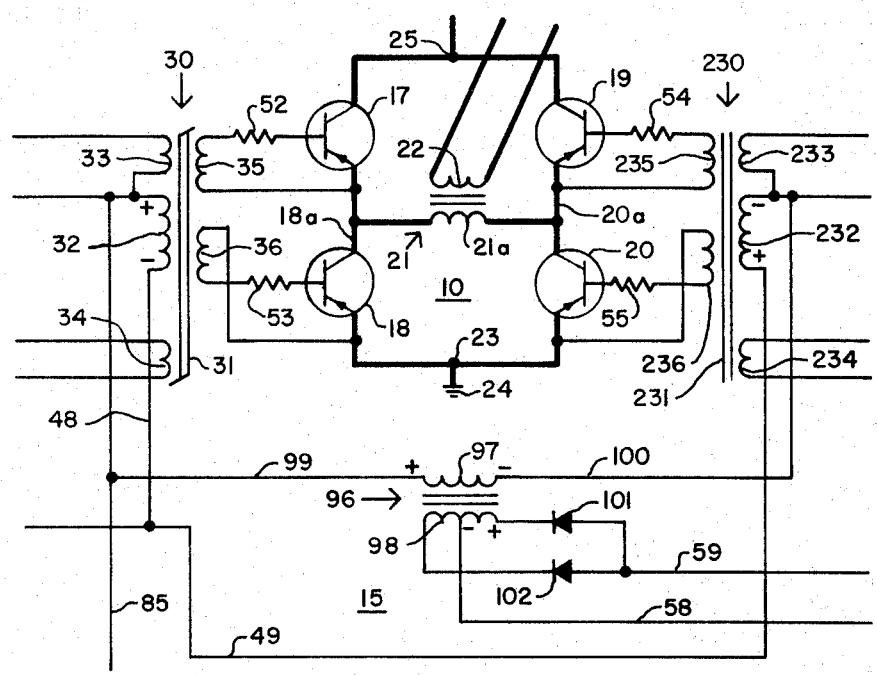
FIGURE 2 is a schematic showing a portion of the circuitry of FIGURE 1 modified with respect to the phase detecting circuitry and, FIGURES 3 and 4 illustrate waveshapes found at various points in the circuitry of FIGURE 1 for a short timing period and a long timing period, respectively.

The partial circuit shown in FIGURE 2 is similar to the corresponding portion of FIGURE 1 and like parts are identified by like numerals. In the circuit of FIGURE 2 the phase detecting circuit 16 may include a transformer 96 having a primary winding 97 and a center-tapped secondary winding 98. In order that current may flow through the primary winding 97 when the upper ends of the primary windings 32 and 232 of the transformer 30 and 230, respectively, have dissimilar potential thereon, the left end of the primary winding 97 is connected to the lead 85 through a lead 99 while the right end is connected to the upper end of the primary winding 232 through a lead 100. The opposite ends of the secondary winding 98 are connected to the lead 59 through respective diodes 101 and 102 while the center tap of that winding is connected to the lead 58 so that voltage and current will be supplied to the timing circuit 14 when current flows through the primary winding 97.

When the polarity of the primary winding 32 and the polarity of the primary winding 232 are as indicated in FIGURE 2, current will flow from the upper end of the winding 32 through the lead 85, the lead 99, the primary winding 97 and the lead 100 to the upper end of the primary winding 232. This current flow will cause current to be supplied through the rectifier 102 to the capacitor 68 of the timing circuit. However, if the upper ends of the winding 32 and 232 are both positive or both negative, no current will flow through the primary winding 97 of the transformer 96. When the polarities of the windings are reversed from those shown in FIGURE 2, current will flow from right to left through the primary winding 97 of the transformer 96, and, consequently, current will now be supplied through the rectifier 101 to the capacitor 68 of the timing circuit. Thus, the phase detecting circuit 15 of FIGURE 2 supplies voltage and current to the timing circuit when the master oscillator 11 and the slave oscillator 12 are of a predetermined phase relationship to one another, that is, when the upper ends of the windings 32 and 232 as shown in FIGURES 1 and 2 are of opposite polarity.

From the foregoing it will be seen that there is provided a D-C to D-C converter which includes a quasi square wave generator having a master oscillator and a slave oscillator controlling respective halves of a power bridge. A phase detecting circuit supplies voltage and current to a timing circuit when there is a predetermined phase relationship between the oscillators. The timing circuit is controlled by an output voltage sensing circuit to establish an appropriate timing period at the end of which an output pulse from the timing circuit causes the slave oscillator to switch whereby the quasi square wave voltage pulse is terminated.

The phase detecting circuits 15 described herein are arranged to supply voltage to the timing circuit 14 when the phase relationship between the master oscillator 11 and the slave oscillator 12 is such that voltage appears on the secondary winding 22 of the output transformer 21. However, as an alternative, voltage can be applied to the timing circuit from the phase detecting circuit when there is no output voltage on the power bridge 10. This may be accomplished by reversing the phase of the pair of drive windings 35 and 36 of the transformer 30 or of the pair of drive windings 235 and 236 of the transformer 230.

With the foregoing alternative arrangement of the phase detecting circuit, it will be seen that the timing period now corresponds to the off period of the power bridge consequently, increasing the timing period decreases the pulse width of the quasi square wave output voltage of the bridge while decreasing the timing period increases it. Accordingly, the output voltage sensing circuit 13 must be appropriately modified to lengthen the timing period when the voltage between terminals 29a and 29b tends to increase and to shorten the timing period when that voltage tends to decrease. Such modifications will be obvious to those skilled in the art.

It will be understood that the embodiments shown herein are for explanatory purposes and may be changed or modified without departing from the spirit and scope of the invention as set forth in the claims appended hereto.

What I claim is:

1. In a D-C to D-C converter of the type in which regulation of the output voltage supplied to a load is provided by controlling the time lag of the switching activity of a slave oscillator with respect to a master oscillator, in combination, output voltage sensing means, timing circuit means, phase detecting means, means for connecting said phase detecting means to said timing circuit means to supply voltage and current thereto thereby establishing a timing period when the master and slave oscillators are of a predetermined phase relationship, means for connecting said output voltage sensing means to the load, means for connecting said output voltage sensing means to said timing circuit means to control the timing period, means for operatively coupling said timing circuit to said slave oscillator whereby said slave oscillator is caused to switch at the end of each timing period.

2. In a D-C to D-C converter of the type in which regulation of the output voltage supplied to a load is provided by controlling the time lag of the switching activity of a slave oscillator with respect to a master oscillator, in combination, output voltage sensing means, timing circuit means, switching control means, a first detecting winding coupled to said master oscillator, a second detecting winding coupled to said slave oscillator, rectifying means, means for connecting said first detecting winding to said second detecting winding and including said rectifying means, means for connecting said first detecting winding to said timing circuit means and means for connecting said second detecting winding to said timing circuit means to provide energy thereto, means for connecting said output voltage sensing means to the load, means for connecting said output voltage sensing means to said timing circuit means to control the timing period of said timing circuit, means for connecting said switching control means between the master oscillator and the slave oscillator, means for connecting said timing circuit means to said switching control means whereby the slave oscillator is made to switch at the end of each timing period.

3. In a D-C to D-C converter of the type in which regulation of the output voltage being supplied to a load is accomplished by controlling the time lag of the switching activity of a slave oscillator with respect to a master oscillator, in combination, output voltage sensing means, timing circuit means, switching control means, a first center-tapped detecting winding coupled to said master oscillator, a second center-tapped detecting winding coupled to said slave oscillator, first and second rectifying means, means for connecting said first rectifying means between one end of said first detecting winding and one end of said second detecting winding, means for connecting said second rectifying means between the other end of said first detecting winding and the other end of said second detecting winding, means for connecting said timing circuit means between the center-tap of said first detecting winding and the center tap of said second detecting winding whereby said timing circuit means is energized by the switching activity of said master and slave oscillators, means for connecting said output voltage sensing means to the load, means for connecting said output voltage sensing means to said timing circuit means to control the timing period, means for connecting said switching control means between the master oscillator and the slave oscillator, means for connecting said timing circuit means to said switching control means to effect switching of said slave oscillator at the end of the timing period.

4. In a D-C to D-C converter of the type in which regulation of the output voltage supplied to a load is accomplished by controlling the time lag of the switching activity of a slave oscillator with respect to a master oscillator, in combination, output voltage sensing means, timing circuit means, switching control means, a transformer having a primary winding and a center-tapped secondary winding, first and second rectifying means, means for connecting said primary winding to said transformer between asid master oscillator and said slave oscillator, means for serially connecting said first and second rectifying means between opposite ends of said center-tapped secondary winding of said transformer, means for connecting said timing circuit means between the center tap of said secondary winding of said transformer and a common point between said first and second rectifying means whereby said timing circuit means is appropriately energized, means for connecting said output voltage sensing means to the load, means for connecting said output voltage sensing means to said timing circuit means to control the timing period, means for connecting said switching control means between the master oscillator and the slave oscillator, means for connecting said timing circuit means to said switching control means whereby said switching control means effects switching of said slave oscillator at the end of the timing period.

5. In a D-C to D-C converter including a power bridge having a periodically conductive element in each arm and the output of which is supplied to a load through a rectifier and a filter, in combination, a master oscillator including a transformer having primary winding means traversed by A-C, drive winding means and detecting winding means, means for connecting said drive winding means to the conductive elements on one side of the power bridge, a slave oscillator including a transformer having primary winding means traversed by A-C current, drive winding means, and detecting winding means, means for connecting said drive winding means of said slave oscillator to the conductive elements on the other side of the bridge, switching control means, timing circuit means, output voltage sensing means, rectifying means, means for serially connecting said detecting winding means of said master oscillator, said detecting winding means of said slave oscillator and said rectifying means across said timing circuit means to supply power thereto, means for connecting said output voltage sensing means to the load, means for connecting said output voltage sensing means to said timing circuit means to control the timing period, means for connecting said timing circuit means to said switching control means, means for connecting said switching control means between one end of said primary winding of said master oscillator and one end of said feedback winding of said slave oscillator whereby said slave oscillator is caused to switch at the end of the timing period.

6. In a D-C to D-C converter including a power bridge having a conductive element in each arm and the output of which is supplied to a load through a rectifier and a filter, in combination, a master oscillator including a transformer having a primary winding traversed by alternating current, drive winding means, means for connecting said drive winding means to the conductive elements on one side of the power bridge, a slave oscillator including at least one on-off switch means, a transformer having a primary winding through which current is directed by said on-off switch, drive winding means and at least one feedback winding, means for connecting said drive winding means of said slave oscillator to the conductive elements on the other side of the bridge, means for connecting said feedback winding to said on-off switch means to control the conduction thereof, switching control means, timing circuit means, output voltage sensing means, means for connecting said output voltage sensing means to the load to detect the voltage thereacross, means for connecting said output voltage sensing means to said timing circuit means to control the timing period, means for connecting said switching control means between one end of said primary winding of said master oscillator and one end of said feedback winding of said slave oscillator, means for connecting the other end of said feedback winding of said slave oscillator to one end of said primary winding of said slave oscillator, means for connecting the other end of said primary winding of said master oscillator to the other end of said primary winding of said slave oscillator, a phase detecting transformer having a primary winding and a center-tapped secondary winding, first and second diodes, means for connecting said primary winding of said phase detecting transformer between said one end of said primary winding of said master oscillator and one end of said primary winding of said slave oscillator, means for connecting each of said first and second diodes between opposite ends of said center-tapped secondary winding of said detecting transformer and a common junction, means for connecting said timing circuit between said common junction and the center-tap of said secondary winding of said detecting transformer whereby said timing circuit is energized, means for connecting said timing circuit to said switching control means to effect switching of said slave oscillator at the end of the timing period.

7. In a D-C to D-C converter of the type in which regulation of the output voltage supplied to a load is accomplished by controlling the time lag of the switching activity of a slave oscillator with respect to a master oscillator, in combination, output voltage sensing means, a timing circuit including a network comprising serially connected capacitive means and resistive means, a pulse transformer having a primary winding means and secondary winding means, a semiconductor switch, means for connecting said primary winding of said pulse transformer and said semiconductor switch in circuit relationship to said capacitive means, variable conducting means having a control means, means for connecting said variable conducting means in parallel with said resistive means to control the charging rate of said capacitive means, means for connecting said control means of said variable conducting means to said output voltage sensing means, switching control means, a first detecting winding coupled to said master oscillator, a second detecting winding coupled to said slave oscillator, first and second rectifiers, means for connecting said first and second detecting windings across said network comprising resistive means and capacitive means through said first and second rectifiers, means for connecting said output voltage sensing means to the load, means for connecting said switching control means between the master oscillator and the slave oscillator, means for connecting said secondary winding means of said pulse transformer of said timing circuit to said switching control means whereby the slave oscillator is made to switch at the end of each timing period.

8. In a D-C to D-C converter of the type in which regulation of the output voltage supplied to a load is accomplished by controlling the time lag of the switching activity of a slave oscillator, in combination, timing circuit means, output voltage sensing means including semiconductor amplifying means, a constant voltage device connected in circuit relationship with said semiconductor amplifying means, means for developing a potential proportional to the output voltage, means for connecting said last named means in circuit relationship with said semiconductor amplifying means whereby said potential proportioned to the output voltage is compared to the voltage across said constant voltage device, means for connecting said semiconductor amplifying means to said timing circuit means, switching control means, a first detecting winding coupled to said master oscillator, a second detecting winding coupled to said slave oscillator, first and second rectifiers, means for connecting said first and second detecting windings serially across said timing circuit through said first and second rectifiers, means for connecting said output voltage sensing means to the load, means for connecting said switching control means between the master oscillator and the slave oscillator, means for connecting said timing circuit to said switching control means whereby the slave oscillator is made to switch at the end of each timing period.

9. In a D-C to D-C converter of the type in which regulation of the output voltage supplied to a load is provided by controlling the time lag of the switching activity of a slave oscillator with respect to a master oscillator, in combination, output voltage sensing means, timing circuit means, switching control means, winding means interconnecting the master oscillator and the slave oscillator, rectifying means, means for connecting said winding means across said timing circuit through said rectifying means, means for connecting said output voltage sensing means to the load, means for connecting said output voltage sensing means to said timing circiut means to control the timing period, means for connecting said switching control means between the master oscillator and the slave oscillator, means for connecting said timing circuit means to said switching control means whereby the slave oscillator is caused to switch at the end of each timing period.

10. In a D-C to D-C converter of the type in which regulation of the output voltage supplied to a load is provided by controlling the time lag of the switching activity of a slave oscillator with respect to a master oscillator, in combination, output voltage sensing means, timing circuit means, switching control means, rectifying means, means for comparing an instantaneous output voltage of the master oscillator to an instantaneous output voltage of the slave oscillator, means for connecting said last named means across said timing circuit means through said rectifying means, means for connecting said output voltage sensing means to the load, means for connecting said output voltage sensing means to said timing circuit means to control the timing period, means for connecting said switching control means between the master oscillator and the slave oscillator, means for connecting said timing circuit means to said switching control means whereby the slave oscillator is caused to switch at the end of each timing period.

11. In a D-C to D-C converter of the type in which regulation of the output voltage being supplied to a load is accomplished by controlling the time lag of the switching activity of a slave oscillator with respect to a master oscillator, in combination, output voltage sensing means, timing circuit means, a first center-tapped detecting winding coupled to said master oscillator, a second center-tapped detecting winding coupled to said slave oscillator, first and second rectifying means, means for connecting said first rectifying means between one end of said first detecting winding and one end of said second detecting winding, means for connecting said second rectifying means between the other end of said first detecting winding and the other end of said second detecting winding, means for connecting said timing circuit means between the center tap of said first detecting winding and the center tap of said second detecting winding whereby said timing circuit means is energized by the switching activity of said master and slave oscillators, means for connecting said output voltage sensing means to the load, means for connecting said output voltage sensing means to said timing circuit means to control the timing period, means for operatively coupling said timing circuit means to said slave oscillator to effect switching thereof at the end of each timing period.

12. In a D-C to D-C converter of the type in which regulation of the output voltage supplied to a load is accomplished by controlling the time lag of the switching activity of a slave oscillator with respect to a master oscillator, in combination, output voltage sensing means, timing circiut means, a transformer having a primary winding and a center-tapped secondary winding, first and second rectifying means, means for connecting said primary winding of said transformer between said master oscillator and said slave oscillator, means for serially connecting said first and second rectifying means between opposite ends of said center-tapped secondary winding of said transformer, means for connecting said timing circuit means between the center tap of said secondary winding of said transformer and a common point between said first and second rectifying means whereby said timing circuit means is appropriately energized, means for connecting said output voltage sensing means to the load, means for connecting said output voltage sensing means to said timing circuit means to control the timing period, means for operatively coupling said timing circuit means to said slave oscillator to effect switching thereof at the end of the timing period.

13. In a D-C to D-C converter of the type in which regulation of the output voltage supplied to a load is provided by controlling the time lag of the switching activity of a slave oscillator with respect to a master oscillator, in combination, output voltage sensing means, timing circuit means, phase detecting means including winding means interconnecting the master oscillator and the slave oscillator and rectifying means, means for connecting said winding means across said timing circuit through said rectifying means, means for connecting said output voltage sensing means to the load, means for connecting said output voltage sensing means to said timing circuit means to control the timing period, means for operatively coupling said timing circuit means to said slave oscillator whereby the slave oscillator is caused to switch at the end of each timing period.

14. In a D-C to D-C converter of the type in which regulation of the output voltage supplied to a load is provided by controlling the time lag of the switching activity of a slave oscillator with respect to a master oscillator, in combination, output voltage sensing means, timing circuit means, rectifying means, means for comparing an instantaneous output voltage of the master oscillator to an instantaneous output voltage of the slave oscillator, means for connecting said last named means across said timing circuit means through said rectifying means, means for connecting said output voltage sensing means to the load, means for connecting said output voltage sensing means to said timing circuit means to control the timing period, means for connecting said timing circuit means to said slave oscillator whereby the slave oscillator is caused to switch at the end of each timing period.

15. In a power supply of the type in which control of the output voltage supplied to a load is provided by controlling the time lag of the switching activity of a slave oscillator with respect to a master oscillator, in combination, a source of D-C power, a load, inverter means including master slave oscillator means, means for connecting the input of said inverter means across said source of D-C power, means for connecting the output of said inverter means across said load, phase detecting means, means for connecting said phase detecting means to the master oscillator, means for connecting the phase detecting means to the slave oscillator to detect the oscillatory phase difference between the slave and master oscillators, timing means, means for connecting the output of said phase detecting means to the input of said timing means to initiate the timing activity of said timing means in response to change in oscillatory phase relationship between the master and slave oscillators, switching control means connecting the output of said timing means to the input of the slave oscillator to initiate phase reversal of the slave oscillator, timing control means, means for connecting the output of said timing control means to said timing means for controlling the time lag of said timing means to in turn establish the time lag of the slave oscillator with respect to the oscillation of the master oscillator, whereby the slave oscillator is caused to switch at the end of each timing period.

References Cited

UNITED STATES PATENTS

| | | | |
|---|---|---|---|
| 3,010,062 | 11/1961 | Van Emden | 321—18 |
| 3,031,629 | 4/1962 | Kadri | 331—113.1 |
| 3,283,238 | 11/1966 | Huge et al. | |

FOREIGN PATENTS

| | | |
|---|---|---|
| 873,551 | 7/1942 | France. |
| 1,129,060 | 9/1956 | France. |

JOHN F. COUCH, *Primary Examiner.*

W. H. BEHA, *Assistant Examiner.*